Sept. 14, 1943.  C. B. HUSTON  2,329,538
CONTROL SYSTEM
Filed Oct. 19, 1942
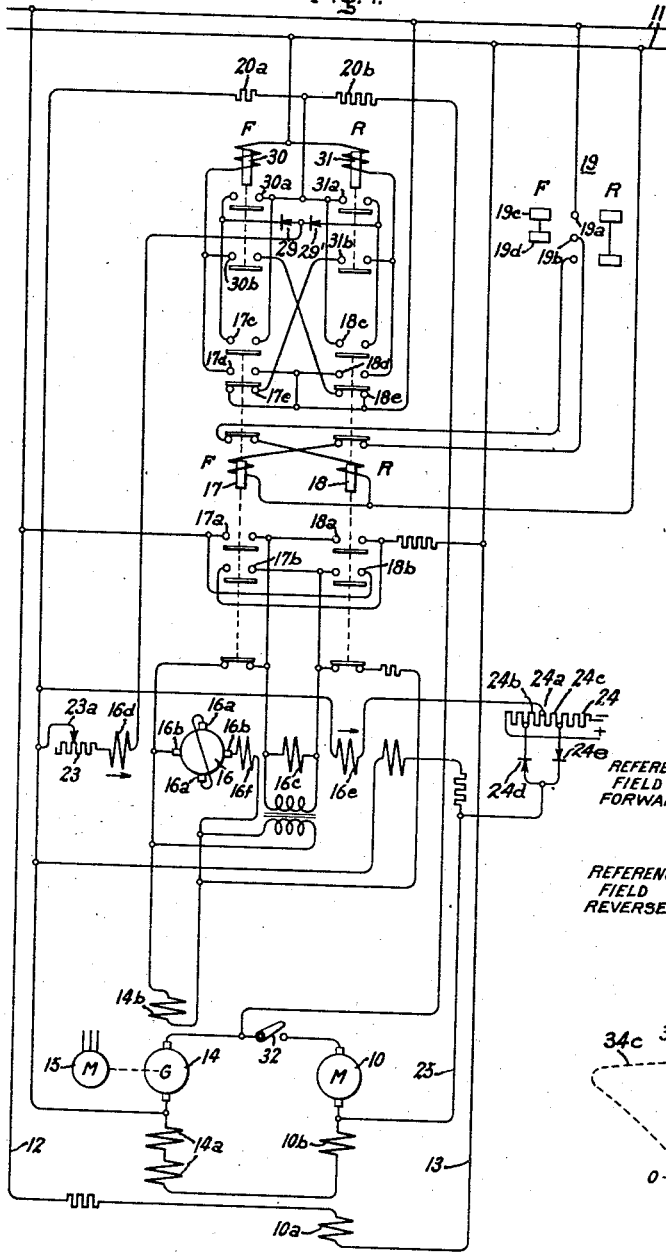
Inventor:
Claude B. Huston,
by Harry E. Dunham
His Attorney.

Patented Sept. 14, 1943

2,329,538

UNITED STATES PATENT OFFICE 2,329,538

CONTROL SYSTEM

Claude B. Huston, Schenectady, N. Y., assignor to General Electric Company, a corporation of New York Application October 19, 1942, Serial No. 462,467

11 Claims. (Cl. 172—179)

This invention relates to control systems, more particularly to systems for controlling the operation of electric motors, and it has for an object the provision of a simple, reliable, and improved control system of this character.

More specifically, the invention relates to control systems in which the motor is supplied from an adjustable voltage generator, the excitation of which is furnished by an exciter having a rapid speed of response, and a further object of the invention is the provision of means for limiting the pump-back current to a predetermined low value during reversals of the motor.

In carrying the invention into effect in one form thereof in a system in which a motor is supplied from an adjustable voltage generator, the exciter for the field of the generator is a dynamoelectric machine which, in turn, is excited by the net difference of a reference component of excitation and a component of excitation which is proportional to the voltage existing at the terminals of the generator and the motor. Means are provided for reversing the polarity of the reference component to reverse the direction of rotation of the motor. In order to limit the pump-back current between the motor and generator during this reversal, means are provided for removing the effect of the voltage component of excitation which otherwise would become and remain additive to the reversed reference component until the generator voltage is reversed.

In illustrating the invention in one form thereof, it is illustrated as embodied in a motor control system that is particularly adapted to the control of motor driven auxiliaries associated with a reversing blooming or slabbing mill such as screwdown equipments, front and rear live tables, side guards, manipulators, and slab and billet shears. The invention also has other applications.

For a better and more complete understanding of the invention, reference should now be had to the following specification and to the accompanying drawing of which Fig. 1 is a simple, diagrammatical illustration of an embodiment of the invention; Fig. 2 is a simple vector diagram which illustrates the relationship of components of excitation of the exciting machine for the adjustable voltage generator; and Fig. 3 is a chart of characteristic curves which facilitate an understanding of the operation of the system embodying the invention.

Referring now to the drawing, the motor 10 is connected to drive a load such as one of the mill auxiliaries mentioned in the foregoing. This motor is illustrated as a direct current motor provided with a separately excited field winding 10a. This field winding may be excited from any suitable source of excitation such as represented by the two supply lines 11 to which the field winding 10a is connected by means of conductors 12 and 13.

The armature of the motor 10 is supplied from an adjustable voltage direct current generator 14 which is driven at a speed that is preferably substantially constant by suitable driving means such as the induction motor 15. As shown, the armatures of the motor 10 and the generator 14 and their respective commutating field windings 10b and 14a are connected in a series loop circuit. The voltage of the generator 14 can be varied over a wide range by varying its excitation, and to this end the generator 14 is provided with a separately excited field winding 14b which is excited by means of a special cross armature reaction excited direct armature reaction compensated dynamoelectric machine 16. The dynamoelectric machine 16 differs from a conventional direct current machine in that it has a pair of auxiliary brushes 16a arranged on an axis that is normally displaced substantially 90 electrical degrees from the axis of the main load brushes 16b. These auxiliary brushes 16a are substantially short circuited by an external conductor. A main directional control or reference field winding 16c is arranged on the axis of the main load brushes and provides a relatively small number of ampere turns. However, the relatively small voltage induced in the armature between the auxiliary brushes by means of the control flux produces a very large current in the short circuit, and this short circuit current gives rise to a very large cross armature flux in line with the short circuited brushes and therefore across, or at an angle, to the ordinary load current armature reaction which is normally substantially in line with the main load brushes 16b. It is this cross armature reaction flux which provides the main operating flux or excitation for the machine. By reason of the low inductance and low resistance of the circuit including the auxiliary brushes, a very small change in the control flux will produce a very large and a very rapid change in the voltage between the main brushes 16b. A series winding 16f is connected in circuit with the main load brushes for substantially completely neutralizing or compensating for the direct armature reaction of the machine.

The main directional control or reference field winding 16c is arranged to be connected for forward and reverse energization thereby to provide for generation of voltage of either polarity by the supply generator 14 and thereby to provide for operation of the motor 10 in either direction as desired. For this purpose, a pair of directional contactors 17 and 18 is provided for connecting the reference field winding 16c to the source 11 for excitation in either direction. It may be assumed that the direction in which the motor 10 rotates when the reference field winding 16c is connected to the source 11 by means of the contactor 17 is the forward direction, and conversely, that the direction in which the motor 10 rotates when the field winding 16c is connected to the source 11 by means of the contactor 18 is the reverse direction. As shown in the drawing, the operation of the directional contactors 17 and 18 is under the control of a reversing type master switch 19. The dynamoelectric machine 16 is also provided with a field winding 16d which is connected across a portion of a potentiometer comprising resistors 20a and 20b. This potentiometer is illustrated as being connected to the terminals of the generator 14. However, since the voltage of the motor 10 is substantially equal to the voltage of the generator 14, the potentiometer 20a, 20b may be connected to the terminals of the motor if desired. In either case, the field winding 16d will be energized in proportion to the voltage existing at the terminals of the generator and the motor. The field winding 16d is arranged on the load current brush axis of the dynamoelectric machine 16 and is connected so that its flux opposes the flux of the reference control field winding 16c. Thus, the reference field winding 16c produces a reference component of excitation of the dynamoelectric machine 16, and the voltage control field winding 16d produces an opposing component of excitation proportional to the voltage of the generator and the motor. The reference field winding 16c tends to increase the voltage of the generator while the voltage control field winding 16d tends to reduce the excitation of the dynamoelectric machine to the point at which a balanced condition is established in which the difference between the fluxes of the reference field winding 16c and the voltage control field winding 16d, or the net excitation, is just sufficient to sustain the voltage of the generator at the desired value.

This balanced condition between the reference field and voltage field components of excitation is illustrated graphically in Fig. 2 in which the component of excitation produced by the reference field is represented by the solid arrow 21, and the opposing component of excitation produced by the voltage control field is represented by the solid arrow 22. The difference between these components which is represented by the solid arrow 23 is the net excitation, i. e., the excitation of the exciter required to produce the generator field current which will produce the desired output voltage of the generator. The voltage supplied by the generator to the motor will be regulated to this value unless it is changed by external adjustment, such for example, as adjustment of the value of the resistor 23 which is connected in series relationship with the voltage control field winding 16d. The greater the amount of the resistor 23 which is actively included in circuit with the field winding 16d, the greater must the voltage of the generator 14 become in order to bring about the balanced relationship between the component excitations of the dynamoelectric machine 16.

For the purpose of limiting the current transmitted between the armatures of the generator 14 and the motor 10 to a predetermined maximum value, the dynamoelectric machine 16 is provided with an additional field winding 16e arranged on the load axis of the machine and connected so that it acts differentially with respect to the excitation of the reference field winding 16c. This additional field winding 16e is energized by a voltage equal to the difference between a reference voltage and a voltage proportional to the current transmitted between the armatures of the generator and motor. This reference voltage is supplied to a potentiometer 24 which is connected to a suitable source of direct current voltage as indicated in the drawing.

The voltage proportional to the current transmitted between the armatures of the generator 14 and the motor 10 is provided by means of a suitable voltage drop device included in the armature loop circuit. Although a suitable shunt or resistor may be employed for this purpose, it is preferred to utilize the voltage drop across the commutating field windings 14a and 10b. The armature terminal of the commutating field winding 10b is connected by means of a conductor 25 and reversely connected half-wave rectifiers 24d and 24e to points of different voltage on the potentiometer 24, and an intermediate point of voltage on the potentiometer, preferably the midpoint, is connected to one terminal of the current limit field winding 16e. The other terminal of the current limit field winding is connected to the armature terminals of the commutating field winding 14a. The reversely connected rectifiers 24d and 24e provide for comparing the voltage drop across the commutating field windings 14a and 10b with the voltage across one or the other of the active portions 24b and 24c of the potentiometer 24 depending upon the direction of current flow between the armatures of the generator and motor, and also serve to prevent energization of the current limit field winding 16e at all times when the current transmitted between the armatures of the generator 14 and motor 10 is less than a predetermined value.

When the lower armature terminal of the generator 14 is positive and when the voltage drop across the commutating field windings 14a and 10b exceeds the voltage drop across the portion 24c of the potentiometer 24, current will flow through the field winding 16e in the direction indicated by the solid arrow. When the current transmitted between the generator and the motor is in the reverse direction and the voltage drop across the commutating field windings 14a and 10b exceeds the voltage drop across the portion 24b of the potentiometer, current will flow through the field winding 16e in the reverse direction.

If in the progress of building up the generator voltage, the current limit should be exceeded, then the current limit field winding 16e becomes energized and assists the voltage field winding 16b in forcing down the net excitation of the dynamoelectric machine 16 to that value required to cause the maximum current to flow in the armature loop circuit of the generator and motor. The motor will stall at this point, and the voltage of the generator will of course be just sufficient to overcome the internal resistance of the armature circuit. The current limit field winding therefore must be capable of developing the full amount of ampere turns of the reference field winding 16c when the predetermined maximum permissible current is flowing in the armature circuit. The relationship of the component excitation of the current limit field winding 16e to the component excitations of the reference field winding and the voltage control field winding is illustrated in Fig. 2 in which the ampere turns of the current limit field winding are represented by the vector 26. The length of the vector 26 is the same as the length of the vector 21 and in the opposite direction, thereby indicating that when the maximum permissible armature current is flowing, the ampere turns of the current limit field winding 16e are equal to the ampere turns of the reference field winding 16c and in the opposite direction.

In order to bring about the desirable snappy action during acceleration, deceleration and reversal of the motor 10 which results from forcing of the generator 14, the ampere turns of the reference field winding 16c are approximately five times the net ampere turns required to bring about the balanced condition of the system. Therefore the ampere turns of the opposing voltage control field winding 16d must be approximately four times the net excitation of the dynamoelectric machine 16. This relationship is illustrated in Fig. 2 in which the length of the reference field vector 21 is approximately five times the length of the net excitation vector 23, and the length of voltage field vector 22 is approximately four times the net excitation vector 23.

If the direction of rotation of the motor 10 is suddenly reversed by reversing the excitation of the reference field 16c, there will be an interval in which the generator voltage is decaying to zero, in which the reference and voltage components of excitation of the dynamoelectric machine 16 are in the same direction. Thus momentarily the reference fields and voltage fields tend to increase the excitation of the dynamoelectric machine 16 to nine times normal net excitation. However, at the maximum permissible value of pump-back current, the reference component of excitation will be offset by the current limit component of excitation, and the voltage field winding 16d will increase the excitation of the dynamoelectric machine 16 to four times normal net excitation. This operating condition is illustrated in Fig. 2 in which the reversed reference field component of excitation is represented by the dotted vector 27, and the reversed current limit component of excitation is represented by the dotted vector 28. The reference field vector 27 and the current limit field vector 28 are of the same length and in opposite direction, indicating that the current limit field balances out the reference field and that the voltage field winding 16d raises the excitation of dynamoelectric machine 16 to four times normal value in a direction to force the decay of the generator voltage and subsequently to build it up in the reverse direction.

As a result of the four times normal net excitation of the exciter 16, the pump-back current between the motor 10 and generator 14 would approach nearly double the maximum permissible value of current, as illustrated by the broken line curve 34c in Fig. 3, before the current limit component of excitation reached the value at which the balanced condition of the system would be restored. The amount of current that can safely be commutated by the commutator of a dynamoelectric machine is strictly limited. In the case of a generator, this limiting value decreases with the voltage owing to the distortion of the total field flux which results from weakening the main field. Consequently, these pump-back current peaks of nearly double the maximum permissible value of current during a reversal when the generator voltage is decaying to zero exceed the value of current which can safely be commutated by a wide margin and produce arcing at the brushes which is destructive of the commutator and the brushes.

For the purpose of eliminating this undesirable operating condition during reversal, means are provided for deenergizing the voltage component of excitation during the reversal until the polarity of the generator voltage is reversed. This is accomplished by means of a pair of reversely connected rectifiers 29 and 29' and a pair of selector relays 30 and 31. Although the rectifiers 29 and 29' may be of any suitable type, they are preferably of the surface contact rectifying type such as the well-known copper oxide rectifier.

The rectifiers 29 and 29' are selectively connected in series relationship with the voltage control field winding 16d in response to the selective operation of the selector relays 30 and 31. When the excitation of the reference field winding 16c is reversed to reverse the generator voltage, the selector relays operate to interrupt the circuit of the voltage control field winding 16d through one of the rectifiers and to complete the connection through the reversely connected rectifier so that current cannot flow through the voltage control field winding 16d until the polarity of the generator voltage is reversed.

With the foregoing understanding of the apparatus and its organization in the system, the operation of the system itself will readily be understood from the following detailed description. The switching device 32 is operated to the closed position to complete the loop circuit between the armatures of the generator 14 and the motor 10. The slider 23a is set at a point on the resistor 23 which corresponds to the desired speed of the motor.

The motor is started in the forward direction by moving the master switch 19 to the forward position in which the fingers 19a and 19b are bridged by their cooperating segments 19c and 19d which are connected together. This completes an energizing circuit for the operating coil of the forward contactor 17 which closes its main contacts 17a and 17b to complete an energizing circuit for the reference field winding 16c to the source 11. Simultaneously, it closes its auxiliary contacts 17c and 17d. Contacts 17c in closing complete the connections of the voltage field winding 16d to the potentiometer 20a, 20b through the rectifier 29, and contacts 17d in closing complete an energizing circuit for the operating coil of the selector relay 30. Relay 30 in responding to energization closes its main contact 30a to complete a connection in parallel with the contact 17c of the forward contactor. Simultaneously, relay 30 closes its auxiliary contacts 30b to complete a holding circuit for the operating coil of relay 30 in parallel with the contact 17d.

As a result of the excitation of its reference field winding 16c, current is caused to flow in the short circuit of the dynamoelectric machine 16 and this short circuit current produces a cross armature reaction flux which causes current to be supplied from the load brushes 16b to the main field winding 14b of the adjustable voltage generator 14. As a result, the generator 14 generates a voltage which is supplied to the armature terminals of the motor 10 and this causes the motor to accelerate. The generator voltage produces a voltage drop across the potentiometer 20a and 20b with the result that current flows through the voltage control field winding 16d and the rectifier 29 in the direction indicated by the solid arrow.

Since the reference field winding 16c produces a component of excitation which is approximately five times the net excitation required for full voltage on the generator 14, the excitation of the generator is quickly forced to its extreme value and the generator voltage rises steeply. However, as the generator voltage rises, the opposing component of excitation produced by the voltage field winding 16d increases proportionately. The acceleration of the motor continues until the difference between the reference component of excitation and the voltage component of excitation is such a value that any further increase in the voltage component would produce a decrease in the speed of the motor 10; in other words, the acceleration continues until a balanced condition is established in the system in which the net excitation, i. e., the difference between the reference component of excitation and the voltage component of excitation is just sufficient to sustain the generator voltage.

The relationship between the generator voltage and current during this portion of the operation is represented by the solid curve 33 in Fig. 3.

If the current limit is exceeded, then the current limit field assists the voltage field 16d to force the net excitation down to the bare minimum value which will cause the maximum permissible value of current to flow. The motor will thus stall at this point which is indicated in Fig. 3 slightly above the point 33b at which the curve 33 crosses the zero voltage ordinate. However, after the acceleration of the motor has been completed the current and voltage of the generator will attain a value such as represented by the point 33a on the curve 33.

In order to reverse the direction of rotation of the motor, the master switch is moved from the forward position to the reverse position. As a result of this, the energizing circuit for the operating coil of the forward contactor 17 is interrupted at the master switch contacts and the forward contactor 17 drops out and opens its main contacts 17a and 17b to disconnect the reference field winding 16c from the source 11. Simultaneously, the forward contactor opens its auxiliary contacts 17c and 17d. The opening of contacts 17d does not deenergize the operating coil of the forward selector relay 30 which remains picked up through its sealing-in contact 30b and interlock contact of the reverse selector relay 31.

In the reverse position of the master switch, an energizing circuit is completed for the operating coil of the reverse contactor 18, and this contactor in responding closes its main contacts 18a and 18b to connect the reference field winding 16c to the source 11 for energization in the reverse direction so that the excitation of this field winding at this point is represented by the dotted vector 27 in Fig. 2. Simultaneously, reverse contactor 18 closes its auxiliary contacts 18c and 18d and opens its interlock contacts 18e. Contacts 18e in opening interrupt the sealing-in circuit for the operating coil of forward selector relay 30 which drops out to interrupt the connections between the voltage control field winding 16d and the junction point between the resistors 20a and 20b of the potentiometer which is connected across the generator terminals. Contacts 18d in closing complete an energizing circuit for the operating coil of the reverse selector relay 31. In response to energization, relay 31 closes its main contact 31a to complete connections from the voltage control field winding 16d through rectifier 29' to the junction point of the resistors 20a and 20b of the potentiometer, and contacts 31b in closing complete a sealing-in circuit for the operating coil of relay 31 through the normally closed interlock contact 17e of the forward contactor 17.

At the instant of reversal of the reference field winding 16c, the polarity of the generator voltage remains unchanged since owing to the time constant of the generator field winding, the flux has not yet had time to decay. Consequently, no current flows through the voltage control field winding 16d because its connections to the potentiometer are through the rectifier 29' which is reversely connected with respect to the rectifier 29 through which current flows when the polarity of the generator voltage is such as to produce rotation of the motor in the forward direction.

As the flux of the generator is forced to decay, the generator terminal voltage becomes less than the voltage of the motor, and consequently, current is pumped back from the motor to the generator in the reverse direction from that in which current flowed when the generator supplied current to the motor. As a result of this, the polarity of the current limit field 16e is reversed, and this condition is represented by the reversed dotted vector 28 in Fig. 2. Since the voltage control field winding 16d is deenergized, the voltage vector 22 decreases to zero. Thus, the only two components of excitation of the dynamoelectric machine 16 which are active at this point are the reverse reference field component represented by the vector 27 and the opposing reverse current limit field component represented by the dotted vector 28. Since the component of excitation produced by the voltage control field is zero, the excitation of the dynamoelectric machine 16 tending to force the decay of the generator voltage cannot go to four times normal net excitation as would be the case if this component were active at this time. In fact, during this reversal, the excitation of the dynamoelectric machine 16 cannot exceed the difference between the component of excitation produced by the reference field and the opposing component produced by the current limit field. As the voltage of the generator 14 is forced to decay, the pumpback current supplied from the motor 10 to the generator 14 increases, and as it increases, the difference between the reference field component and the current limit field component decreases thereby weakening the voltage of the dynamoelectric machine 16 which is forcing the decay of the generator field until a balanced condition results. If the pump-back current should exceed the limiting value for which the current limit field circuit is adjusted, the difference between the reference field component and the current limit field component would become zero and thus the action of the dynamoelectric machine 16 in forcing the decay of the flux of the generator 14 would also become zero with the result that the voltage of the generator 14 would not decrease further until a pump-back current decreased to produce a net difference between the reference field component and the current limit field. Thus, the pump-back current is limited to substantially the same value to which the load current is limited during normal operation.

When the generator voltage passes through zero and begins to attain values of the opposite polarity, the reversely connected rectifier 29' permits current to flow through the voltage control field winding 16d in the reverse direction and from this point on the operation of the system is similar to the forward operation described in the foregoing.

Thus, with this simplified scheme of control, when reversing the reference field component to reverse the direction of rotation of the motor, the circuit through the voltage component field and the conducting rectifier is interrupted and the circuit is reestablished through the reversely connected rectifier. No current, however, is permitted to flow through this circuit until the voltage of the generator has passed through zero and begun to rise in the reverse direction. As a result, the voltage component of excitation of the control scheme is entirely eliminated until the generator voltage has passed through zero and begun to build up in the reverse direction. As a result, the current limit control field is only required to oppose the reference field in limiting the pump-back current to a safe value.

The relationship between the generator voltage and the pump-back current during reversal is illustrated by the curve 34 in Fig. 3 with the maximum pump-back current peak occurring at the point 34a. This peak pump-back current is only slightly in excess of the normal full load value of load current for which the current limit field circuit is adjusted. In other words, sufficient pump-back current is obtained whereby the current limit field component of excitation exceeds the reference field component by a slight amount which is sufficient momentarily to hold up the voltage of the generator in the direction in which it has been established in order to prevent the generator voltage from decreasing so rapidly that the pump-back current would exceed the desired limiting value. As the generator voltage falls as represented by the portion of the curve 34 between the point 34a and the zero voltage axis, this slight excess of current limit component of excitation diminishes and at the zero axis the current limit represented by the point 34b is the same as the load current limit for the forward direction which is represented by the point 33b.

Although in accordance with the provisions of the patent statutes this invention is described as embodied in concrete form and the principle thereof has been explained together with the best mode in which it is now contemplated applying that principle, it will be understood that the apparatus shown and described is merely illustrative and that the invention is not limited thereto, since alterations and modifications will readily suggest themselves to persons skilled in the art without departing from the true spirit of this invention or from the scope of the annexed claims.

What I claim as new and desire to secure by Letters Patent of the United States is:

1. A control system comprising in combination, an adjustable voltage generator, an electric motor supplied therefrom, means for controlling the excitation of said generator comprising a dynamoelectric machine having means for producing a reference component of excitation and an opposing component of excitation proportional to the voltage at the terminals of said generator and motor, means for reversing the polarity of said reference component of excitation to reverse the voltage of said generator, and means for deenergizing said opposing component of excitation until said generator voltage is reduced to a predetermined low value.

2. A control system comprising in combination, an adjustable voltage generator, an electric motor supplied therefrom, a source of reference voltage, means for controlling the excitation of said generator comprising a dynamoelectric machine provided with control field excitation means having connections to said source and to the power conductors between said motor and generator so that said machine is excited by the difference of a reference component of excitation proportional to said reference voltage and a voltage component proportional to the terminal voltage of said generator and motor, means for reversing the polarity of said reference component to reverse the voltage of said generator, and means for deenergizing said voltage component until the voltage of said generator is reduced to a relatively low value.

3. A control system comprising in combination, an adjustable voltage generator, an electric motor supplied therefrom, a source of reference voltage, means for controlling the excitation of said generator comprising a dynamoelectric machine provided with control field excitation means having connections to said source and to the power conductors between raid motor and generator so that said machine is excited by the difference of a reference component of excitation proportional to said reference voltage and a voltage component proportional to the terminal voltage of said generator and motor, means for reversing the connections to said source of reference voltage to reverse the voltage of said generator, and means for deenergizing said voltage component of excitation until the voltage of said generator is reversed.

4. A control system comprising in combination, an adjustable voltage generator, an electric motor supplied therefrom, a source of reference voltage, means for controlling the excitation of said generator comprising a dynamoelectric machine provided with control field excitation means having connections to said source and to the power conductors between said motor and generator so that said machine is excited by the difference of a reference component of excitation proportional to said reference voltage and a voltage component proportional to the terminal voltage of said generator and motor, means for reversing the connections to said source of reference voltage to reverse the voltage of said generator, and means for interrupting the connections to said power conductors and for reestablishing the connections to said power conductors through a unidirectional conducting path of reverse directional conductivity so that said voltage component disappears until the voltage of said generator is reversed.

5. A control system comprising in combination, an adjustable voltage generator, an electric motor supplied therefrom, a source of reference voltage, means for controlling the excitation of said generator comprising a dynamoelectric machine provided with control field excitation means having connections to said source of reference voltage and having connections including oppositely connected rectifiers to the power conductors between said generator and said motor so that said machine is excited by the difference of a reference component of excitation proportional to said reference voltage and a voltage component proportional to the terminal voltage of said generator and motor, switching means for reversing said connections to said source to reverse the voltage of said generator, and for simultaneously interrupting the connections through one of said rectifiers and completing connections through the reversely connected rectifier so that said voltage component of excitation disappears until the voltage of said generator is reversed.

6. A control system comprising in combination, an adjustable voltage generator, an electric motor supplied therefrom, a source of reference voltage, means for controlling the excitation of said generator comprising a dynamoelectric machine provided with control field excitation means, connections from said excitation means to said source and connections including oppositely connected rectifiers from said excitation means to the power conductors between said generator and said motor for exciting said machine by the difference of a reference component of excitation proportional to said reference voltage and a voltage component of excitation proportional to the terminal voltage of said generator and said motor, switching means for selectively completing the connections to said power conductors through one or the other of said rectifiers, a control switching device for reversing the connections to said source of reference voltage to reverse the voltage of said generator and for simultaneously controlling said selective switching means to interrupt the connections through the active rectifier and complete the connections through the reversely connected rectifier so that said voltage component of excitation disappears until the voltage of said generator is reversed.

7. A control system comprising in combination, an adjustable voltage generator, an electric motor supplied therefrom, means providing a reference voltage, means for deriving a control voltage from the terminal voltage of said generator and said motor, means for controlling the excitation of said generator comprising a cross armature reaction excited, direct armature reaction compensated dynamoelectric machine provided with control field excitation means connected to be excited in response to the difference of said reference voltage and said derived voltage, means for reversing the polarity of said reference voltage to reverse the polarity of the voltage of said generator, and means for rendering said control field excitation means unresponsive to said derived voltage until the polarity of the voltage of said generator is reversed.

8. A control system comprising in combination, an adjustable voltage generator, an electric motor supplied therefrom, means for exciting said generator comprising an armature reaction excited dynamoelectric machine, a source of reference voltage, means for supplying a component of excitation to said machine proportional to said reference voltage comprising a reference control field winding having connections to said source, means for supplying a component of excitation to said machine proportional to the terminal voltage of said generator and said motor comprising a voltage control field winding having connections to the power conductors between said generator and motor so that said machine is excited by the difference of said component excitations, oppositely connected rectifiers included in the connections between said voltage control field winding and said power conductors and switching means for selectively completing the connections through said rectifiers, and switching means for reversing the connections from said reference field winding to said source to reverse the voltage of said generator and for interrupting the connections through the active rectifier and completing connections through the reversely connected rectifier so that said voltage component of excitation disappears until the voltage of said generator is reversed.

9. A control system comprising in combination, an adjustable voltage generator, an electric motor supplied therefrom, means for controlling the excitation of said generator comprising a dynamoelectric machine having means for producing a reference component of excitation and an opposing component of excitation proportional to the voltage at the terminals of said generator and motor, means for reversing the polarity of said reference component of excitation to reverse the voltage of said generator, means for deenergizing said opposing component of excitation until said generator voltage is reduced to a predetermined low value, and means responsive to current exchanged between said generator and motor for controlling the excitation of said dynamoelectric machine to limit said current to a predetermined value.

10. A control system comprising in combination, an adjustable voltage generator, an electric motor supplied therefrom, means for controlling the excitation of said generator comprising a dynamoelectric machine having means for producing a reference component of excitation and an opposing component of excitation proportional to the voltage at the terminals of said generator and motor, means for reversing the polarity of said reference component of excitation to reverse the voltage of said generator, means for deenergizing said opposing component of excitation until said generator voltage is reduced to a predetermined low value, and means responsive to current exchanged between said generator and motor for supplying to said dynamoelectric machine a component of excitation opposing said reference component thereby to limit said current to a predetermined value.

11. A control system comprising in combination, an adjustable voltage generator, an electric motor supplied therefrom, means for controlling the excitation of said generator comprising a dynamoelectric machine having means for producing a reference component of excitation and an opposing component of excitation proportional to the voltage at the terminals of said generator and motor, means for reversing the polarity of said reference component of excitation to reverse the voltage of said generator, means for deenergizing said opposing component of excitation until said generator voltage is reduced to a predetermined low value, and means responsive to current exchanged between said generator and motor only in excess of a predetermined value for supplying a component of excitation opposing said reference component thereby to limit said current to a predetermined value.

CLAUDE B. HUSTON.